United States Patent [19]
Ernst

[11] Patent Number: 4,935,169
[45] Date of Patent: Jun. 19, 1990

[54] EVAPORATIVE COOLER

[76] Inventor: Günter Ernst, Str. des Roten Kreuzes 57, 7500 Karlsruhe 41, Fed. Rep. of Germany

[21] Appl. No.: 301,141

[22] Filed: Jan. 25, 1989

[30] Foreign Application Priority Data

Feb. 5, 1988 [DE] Fed. Rep. of Germany ....... 3803534

[51] Int. Cl.⁵ ................................................. F28D 5/00
[52] U.S. Cl. ..................................... 261/153; 261/154; 261/104; 62/304; 62/316
[58] Field of Search ................. 62/304, 305, 315, 316; 261/103, 104, 107, 153, 154

[56] References Cited

U.S. PATENT DOCUMENTS

| | | | |
|---|---|---|---|
| 1,272,937 | 12/1916 | Fulton | 62/315 X |
| 2,182,788 | 12/1939 | Cornell, Jr. | 62/315 X |
| 2,766,597 | 10/1956 | Gilck | 62/315 X |
| 3,362,186 | 1/1968 | Patterson | 62/304 X |
| 4,674,295 | 6/1987 | Curtis, Sr. | 62/304 X |

Primary Examiner—Henry A. Bennet
Assistant Examiner—John Sollecito
Attorney, Agent, or Firm—Rogers & Killeen

[57] ABSTRACT

An evaporative cooler which for the purpose of cooling a fluid flowing within at least one duct (1) evaporates a substance on the outside of said duct, said substance being supplied in liquid form through at least one conduit, is characterized by at least one liquid connector (7) for controlled passage of the liquid from the conduit (6) onto the outside of said duct (1), wherein the outside of the duct (1) is covered by a porous capillary layer (2) into which the liquid connector(s) (7) open(s). The capillary layer (2) may be surrounded by a liquid barrier (3).

31 Claims, 2 Drawing Sheets

EVAPORATIVE COOLER

The present invention is directed to an evaporative cooler which, for the purpose of cooling a fluid flowing within at least one duct, evaporates a substance on the outside of said duct, said substance being supplied in liquid form through at least one conduit within the duct.

It is known to cool an object by causing a liquid—or a solid in exceptional cases—to be evaporated on the surface of said object. In the case of aerospacecraft, for example, this is an important recooling method for the cooling circuit of the electronic system or the conditioning unit for hydraulic fluid, because, as is well known, that there is no ambient air available for absorbing emitted heat. But there are also other cases where bodies to be cooled are surrounded by air, in which evaporation may greatly enhance the cooling process. Spacecraft which are equipped with evaporative coolers also make use thereof during space launching and landing while the generated steam is emitted to the atmosphere.

It is the object of the present invention to provide an evaporative cooler which is of simple structure and which may be used either per se or can be assembled to form larger units, while being light-weight and having small volume.

To solve the specified object the present invention provides an evaporative cooler which for the purpose of cooling a fluid flowing within at least one duct evaporates a substance on the outside of said duct, said substance being supplied in liquid form through at least one conduit, that is integrated in said duct. At least one liquid connector for controlled passage of the liquid from the conduit to the outside of said duct is provided. The duct is externally covered by a capillary layer into which the liquid connector or connectors terminate.

Advantageous further improvements of the invention are specified in the subclaims.

An evaporative cooler according to the present invention is especially suited for use in spacecraft, where light weight, small volume and reliable operation are particularly important.

But quite apart from its use in space, the evaporative cooler also offers the following advantages and possibilities for all other conceivable applications:

It is possible to provide an overall cooling system by division into sub-assemblies of well-matched size, which may be used with different loads, at different temperature levels, in various modes of operation and for different purposes.

The fluid to be cooled may be at a high pressure, while not required to be confined by duct walls of large thickness.

Due to the small ratio between the wall thickness of the ducts and the evaporative cooler surface, the total weight is low.

The volume of the cooling system is small, and, moreover, shape and sub-division of the cooling system can be well matched with prevailing conditions.

The relationship between the elements can be designed so that most of the generated vapour can flow freely to the surrounding area.

The small internal volume of the liquid supply conduits between the location of controlled blocking or throttling by the liquid connectors in accordance with the invention, and the evaporating surface ensures rapid control of the evaporative performance and fast cut-in and cut-out operation.

The liquid to be evaporated requires only a low delivery pressure.

Complete evaporation of the liquid on the cooled surface is ensured, because neither is liquid flung away in the capillary layer due to bubble formation in the liquid, nor is there any rebounding of drops that are sprayed on externally.

Easy series production of relatively simple and small individual elements is possible.

Good and easy checking, maintenance and repair as well as simple replacement of individual elements are made possible by exposed individual elements and by evaporative surfaces that are visible and accessible from the outside of the elements.

The thin liquid film and the good thermal conductivity of the capillary layer, provided the latter is formed, for example, of suitable wire fabric, ensure good heat transition from the fluid to be cooled to the evaporative liquid surface.

Below, preferred embodiments of the present invention will be described in detail with reference to schematic drawings, in which

DETAILED DESCRIPTION OF THE DRAWINGS

Figure 1:
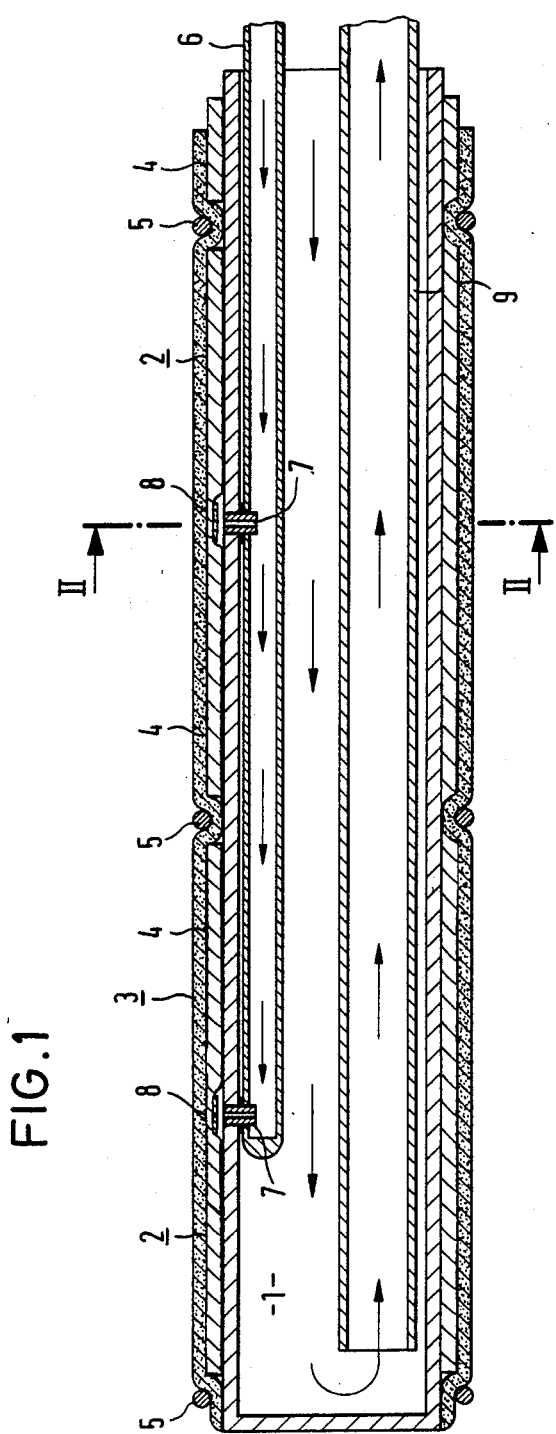
FIG. 1 is a longitudinal sectional view of a cooling element of an evaporative cooler according to the present invention.
Figure 2:
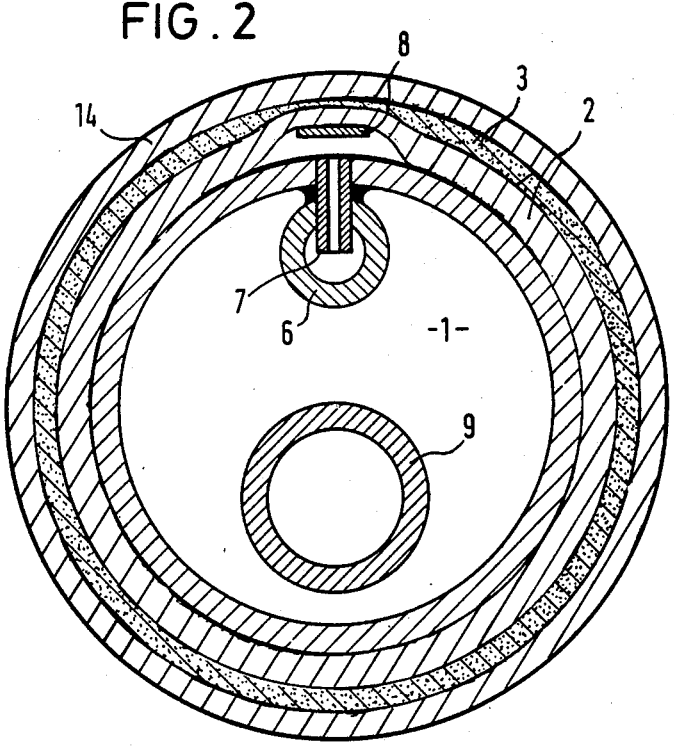
FIG. 2 is a cross-sectional view along the line II—II of FIG. 1.

As shown in FIGS. 1 and 2, a duct 1, which is a relatively thin-walled circular cross-section tube capable of withstanding a high pressure fluid passing therethrough and the requires cooling, such as for an hydraulic fluid, cooling water or some other heat-conducting medium, is surrounded by a porous capillary layer 2 which in its turn is surrounded by a liquid barrier 3. The capillary layer may be formed of fine-meshed screen fabric (mesh size and wire size generally less than 1 mm) which is stretched to annularly surround the duct 1 or is helically wound onto the duct or is "shrunk" onto the duct by means of elongation and transverse contraction in the form of an appropriately woven tube. For good fixing and improved thermal contact the fabric wire may be soldered or adhesively bonded spot-wise to the duct wall where it is in contact therewith. In order to prevent forces of gravitation or inertia acting along the duct 1 from developing any major static pressure differences in the liquid which is present in the capillary layer 2, the capillary layer is subdivided into discrete ring sections 4. In order to prevent such pressure differences from being caused by liquid columns in the liquid supply conduits, the ducts 1 are advantageously mounted in such a way that their longitudinal axes are perpendicular to the expected forces of gravitation and inertia.

A fabric made from a material that cannot be wetted by the liquid is provided on the capillary layer 2 as a liquid barrier 3 by being stretched to annular shape, being wound in tape form, or being fitted like a tube by elongation. When water is employed as the liquid to be evaporated, as would be especially applicable for use in space, said fabric is formed, for instance, from Teflon filaments or Teflon-coated filaments.

For applications on the ground or near-ground (in aircraft), ammonia is advantageously used as the substance to be evaporated, and the fabric for the liquid barrier 3 is a synthetic material which cannot be wetted thereby and is resistant thereto.

When the capillary layer 2 is sub-divided into discrete ring-like sections 4, the liquid barrier 3 can be fixed at the boundaries by means of filaments or wires 5 on the duct wall which is exposed thereat or on the capillary layer 2 which is compressed thereat. A coarser-meshed and mechanically more stable backing fabric 14 (FIG. 2), which is fitted over the liquid barrier to stabilize the same against the liquid pressure, is not illustrated in FIG. 1 for greater clarity.

Within the duct 1 there is provided a conduit 6 for supplying the liquid to be evaporated. At least in the vicinity of its outlet opening the conduit 6 is joined to the duct wall, for instance by soldering so that fluid to be cooled and liquid to be evaporated remain separate from each other. For controlled throttling of the liquid, capillary tubes 7 of suitable diameter and suitable length are fitted into the outlet openings of the conduit 6.

Small sheet-metal baffle plates 8 secured to the duct wall guide the exiting liquid flow in the direction in which the capillary layer 2 extends on the outer surface of the duct 1.

When ducts 1, conduits 6 etc. form cooling elements which are capped at one of their ends (as illustrated in FIG. 1), an additional tube 9 is integrally provided which is open-ended and supplies or discharges the fluid to be cooled.

If a cooling area of, for instance, 1 m² is to be formed by such capped cooling elements having an outer diameter of, for instance, 12 mm and a length of, for instance, 300 mm, approximately 90 cooling elements must be connected to form a unit. These elements may be arranged so that the generated vapour is readily discharged and the elements form either a unit or plural sub-units which, while having small overall volume, have their shape adapted to the externally prevailing conditions and are advantageously arranged so that the longitudinal axes of the elements extend in a desired direction so as to prevent the development of any major hydrostatic pressure differences in the liquid.

Figure 3:
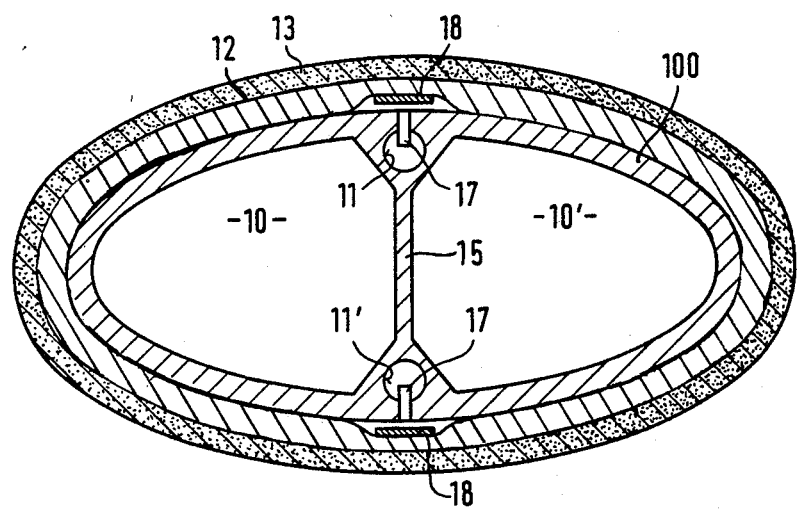
FIG. 3 is a cross-sectional view similar to FiG. 2 and illustrating a modified cooling element according to the present invention.

FIG. 3 illustrates a cooling element used in an actually built structure, in which an extruded section 100 defines two ducts 10, 10' which are separated by a partition 15. For instance, the ducts 10 and 10' may be used for supplying and discharging the liquid to be cooled, respectively. In the vicinity of the partition 15, conduits 11 for supplying liquid to be evaporated and 11' for discharging liquid are integrally provided which also in the present example terminate in a capillary layer 12 via capillary tubes 17, said capillary layer being flared in the vicinity of the capillary tubes 17 and being provided thereat with baffles 18 for uniformly distributing the exiting liquid across the capillary layer 12.

Similar to the embodiment illustrated in FIGS. 1 and 2, the capillary layer 12 is surrounded by a liquid barrier 13 of the same structure as the barrier 3 illustrated in the embodiment of FIGS. 1 and 2, and the barrier 13 is in turn surrounded by a backing fabric (not illustrated in FIG. 3) which corresponds to the backing fabric 14 (FIG. 2).

FIG. 3 shows but one of the various possible configurations in respect of the cross-section of an evaporative cooling-type cooling element in accordance with the present invention. This design variability is also provided in longitudinal direction of the cooling elements so that these may also be adapted to limited spatial conditions existing especially in spacecraft.

As an alternative to the described embodiments, the liquid barrier 3 or 13 may be completely omitted provided the capillary layer 2 or 12 and the liquid connectors 7, 17 are configured in such a way that the outer surface of the ducts 1 is wetted by liquid to be evaporated solely on account of the capillary forces, while for the rest the liquid is retained by the capillary forces within the capillaries of the porous capillary layer 2 or 12, respectively.

I claim:

1. An evaporative cooler which, for the purpose of cooling a fluid flowing within at least one duct, evaporates a substance on the outside of said duct, said substance being supplied in liquid form through at least one conduit, characterized in that said conduit (6, 11, 11') is carried within the exterior surface of said duct (1, 10, 10'), that at least one liquid connector (7) for controlled passage of the liquid from the conduit (6, 11, 11') to the outside of said duct (1, 10, 10') is provided, that the duct is externally covered by a capillary layer (2, 12) into which the liquid connector or connectors (7, 7) terminate, and that said capillary layer (2, 12) is covered by a gas-permeable liquid barrier (3, 13).

2. Evaporation cooler as claimed in claim 1, characterized in that the liquid connectors at the outlets of the conduit are configured so that the surface of the ducts is wetted by liquid only due to the capillary forces in the capillary layer while the liquid is retained by the capillary forces.

3. Evaporative cooler as claimed in claim 1, characterized in that the liquid barrier (3, 13) is formed of sintered material or of a fabric of a material that is non-wettable by the liquid, especially of a synthetic material such as tetrafluoroethylene.

4. Evaporative cooler as claimed in claim 1, characterized in that the liquid barrier (3, 13) is adhesively bonded or sintered to the capillary layer (2, 12).

5. Evaporative cooler as claimed in claim 1, characterized in that the liquid barrier (3, 13) is stretched across the capillary layer (2, 12) where the outer wall of the ducts is planar or outwardly curved.

6. Evaporative cooler as claimed in claim 5, characterized in that the liquid barrier (3, 13) is tubular and fitted onto the duct (1, 10, 10') or is of tape-like structure and wound onto the duct (1, 10, 10').

7. Evaporative cooler as claimed in claim 1, characterized in that the liquid barrier (3, 13) is formed of a fine-pore thin layer having a relatively large open cross-sectional area, said layer being retained by a superposed, mechanically stable, large-pore backing layer (14).

8. Evaporative cooler as claimed in claim 1, characterized in that the capillary layer (2) is divided into sections (4), said sections (4) being bounded by the liquid barrier (3, 13) so that the development of major pressure differences in the liquid of a section as caused by forces of gravity or inertia acting tangentially to the outer surface of the ducts is prevented.

9. Evaporative cooler as claimed in claim 8, characterized in that the capillary layer (2, 12) of a section (4) is confined internally by the wall of the duct (1, 10, 10') and externally by the liquid barrier (3, 13) and at the axial boundaries with adjacent sections by connection of the liquid barrier (3, 13) to the duct wall.

10. Evaporative cooler as claimed in claim 1, characterized in that a plurality of ducts (10, 10') and a plurality of conduits (11, 11') are combined in a section tube, especially an extruded section tube (100) which is surrounded by the capillary layer (12) and the liquid barrier (13).

11. Evaporative cooler as claimed in claim 1, characterized in that the capillary layer (2, 12) is formed of sintered material, screen fabric or the like and is joined to the outside of the duct (1, 10, 10') by soldering, welding, adhesive bonding or the like.

12. Evaporative cooler as claimed in claim 1, characterized in that the outlet openings of the liquid connectors (7, 17) are distributed across the outer surface of the capillary layer of each duct (1, 10, 10') in such a way that the liquid within the capillary layer (2, 12) is uniformly distributed across said outer surface.

13. Evaporative cooler as claimed in claim 1, characterized in that the flow of liquid exiting from said connector (3, 17) is directed by baffle plates (8, 18) so that it enters the capillary layer (2) tangentially to the outer surface of said duct (1).

14. Evaporative cooler as claimed in claim 1, characterized in that the liquid connectors (7, 17) are formed by capillary tubes passing through the walls of the conduits (6, 11, 11'), the flow resistance of said capillary tubes being variable by suitable selection of length and/or diameter such that the desired liquid distribution is achieved.

15. Evaporation cooler as claimed in claim 1, characterized in that an additional tube (9) is provided in said duct (1) through which the fluid flows when said duct (1) is capped at one end.

16. Evaporative cooler as claimed in claim 1, characterized in that additional conduits with corresponding inlet openings are provided for returning the liquid from the capillary layer.

17. An evaporative cooler as defined in claim 1 comprising more than one said duct and more than one said conduit, wherein one said duct is used to supply the fluid to be cooled and a second said duct is used to return the fluid that has been cooled, and wherein one said conduit is used to supply the liquid to be evaporated and a second said conduit is used to return liquid that was not evaporated.

18. Evaporative cooler as claimed in claim 1, characterized in that the liquid barrier is formed by one of a non-wettable impregnation and (b) a non-wettable porous coating of the outer surface of the capillary layer.

19. An evaporative cooler comprising:
 (a) a duct having an interior surface for confining a fluid to be cooled;
 (b) a conduit carried by said duct internally of said fluid confining interior surface for holding an evaporative substance;
 (c) a capillary layer carried by said duct externally of said fluid confining surface for facilitating evaporation of the evaporative substance; and
 (d) outlet means for establishing fluid communication between said conduit and said capillary layer whereby evaporation of the evaporative substance from said capillary layer cools the fluid confined by said duct.

20. Evaporative cooler as claimed in claim 19, wherein said capillary layer carries a gas-permeable liquid barrier.

21. Evaporative cooler as claimed in claim 19, characterized in that the flow of evaporative substances from said outlet means is directed by baffle plates (8, 18) so that it enters the capillary layer 2, 12) tangentially to the outer surface of said duct (1).

22. Evaporative cooler as claimed in claim 19, characterized in that said outlet means comprises capillary tubes passing through the walls of the conduits (6, 11, 11'), the flow resistance of said capillary tubes being variable by suitable selection of length and/or diameter such that the desired liquid distribution is achieved.

23. Evaporative cooler as claimed in claim 19, characterized in that an additional tube (9) is provided in said duct (1) through which the fluid flows when the duct (1) is capped at one end.

24. Evaporative cooler as claimed in claim 19, wherein said capillary layer (2, 12) comprises sintered material, screen fabric or the like and is joined to the outside of the duct (1, 10, 10') by soldering, welding, adhesive bonding or the like.

25. Evaporative cooler as claimed in claim 19, further comprising an additional conduit for returning the evaporative substance from said capillary layer.

26. Evaporative cooler as claimed in claim 19, wherein said outlet means are distributed so that the evaporative substance within the capillary layer (2, 12) is uniformly distributed across said capillary layer.

27. Evaporative cooler as claimed in claim 20, characterized in that the liquid barrier is formed by one of (a) a non-wettable impregnation and (b) a non-wettable porous coating of the outer surface of the capillary layer.

28. An evaporative cooler as defined in claim 19 further comprising a first return passageway for carrying fluid cooled by said duct, and a second return passageway for carrying the unevaporated portions of the evaporative substance.

29. In an evaporative cooler having a first duct for internally carrying a fluid to be cooled, and a capillary layer carried externally by said duct for an evaporative substance whereby evaporation of the evaporative substance from said capillary layer cools the fluid carried by said first duct, the improvement comprising:
 (a) a second duct inside said first duct for carrying said evaporative substance; and
 (b) means for establishing fluid communication between said second duct and said capillary layer.

30. An evaporative cooler for cooling a fluid comprising:
 (a) a duct for containing fluid to be cooled and having a capillary layer carried by the external surface thereof for cooling the fluid by evaporation of a liquid therefrom;
 (b) a conduit within said external surface for containing an evaporative liquid; and
 (c) capillary tube means for conveying the evaporative liquid from said conduit to said layer wherein the resistance to the conveyance of the liquid may be selectively variable by varying the length and diameter thereof.

31. The cooler as defined in claim 30 further comprising a gas permeable liquid barrier carried by said capillary layer.

* * * * *